United States Patent [19]

Haberkern

[11] Patent Number: 5,214,514

[45] Date of Patent: May 25, 1993

[54] COMPACT VIDEO/SOUND APPARATUS WITH FOLDABLE SCREEN

[76] Inventor: Ottmar Haberkern, Reuchlinstr. 20, 6200 Wiesbaden, Fed. Rep. of Germany

[21] Appl. No.: 563,428

[22] Filed: Aug. 7, 1990

[30] Foreign Application Priority Data

Aug. 7, 1989 [DE] Fed. Rep. of Germany ....... 3926153

[51] Int. Cl.⁵ .......................................... H04N 5/781
[52] U.S. Cl. .................................. 358/335; 358/342; 358/254
[58] Field of Search ............... 358/310, 335, 185, 342, 358/254; 360/33.1, 137; 369/10, 11, 12, 292, 75.1, 76, 77.1, 80; D14/129, 135, 136

[56] References Cited

U.S. PATENT DOCUMENTS

| | | | |
|---|---|---|---|
| 4,151,470 | 4/1979 | Sato | 325/311 |
| 4,510,589 | 4/1985 | Ito | 369/11 |
| 4,633,328 | 12/1986 | Haberkern et al. | 358/254 |
| 4,658,956 | 4/1987 | Takeda et al. | 358/254 |
| 4,764,817 | 8/1988 | Blazek et al. | 358/341 |
| 4,803,560 | 2/1989 | Matsunaga et al. | 358/236 |
| 4,873,584 | 10/1989 | Hashimoto | 358/335 |

FOREIGN PATENT DOCUMENTS

| | | |
|---|---|---|
| 0149101 | 5/1984 | European Pat. Off. . |
| 3444285 | 6/1986 | European Pat. Off. . |
| 41061 | 3/1980 | Japan .................. 358/254 |
| 92086 | 7/1980 | Japan .................. 358/254 |
| 2204754 | 11/1988 | United Kingdom ............ 369/1 |

Primary Examiner—Tommy P. Chin
Assistant Examiner—Robert Chevalier
Attorney, Agent, or Firm—Gifford, Groh, Sprinkle, Patmore and Anderson

[57] ABSTRACT

A video/sound apparatus in the form of a suitcase-like foldable housing, including a housing cover portion (2) for accommodating a projection screen as well as a housing bottom portion (1) for accommodating various control elements (11), the video/sound apparatus including further a video recording and playback device as well as auxiliary recepticles (21) for connection with auxiliary equipment, with the two housing portions (1, 2) being joined to one another by a hinge member (3) which contains the stereo speakers (4a, 4b), and with the video/sound apparatus also being equipped with a TV receiving/reproduction section and a CD record player (13). While the video/sound apparatus according to the invention is very versatile with respect to its various functions which go beyond that of an apparatus for use strictly as a video/sound recorder, it is very compact and it combines the functions of a television, video recorder and CD record player.

10 Claims, 2 Drawing Sheets

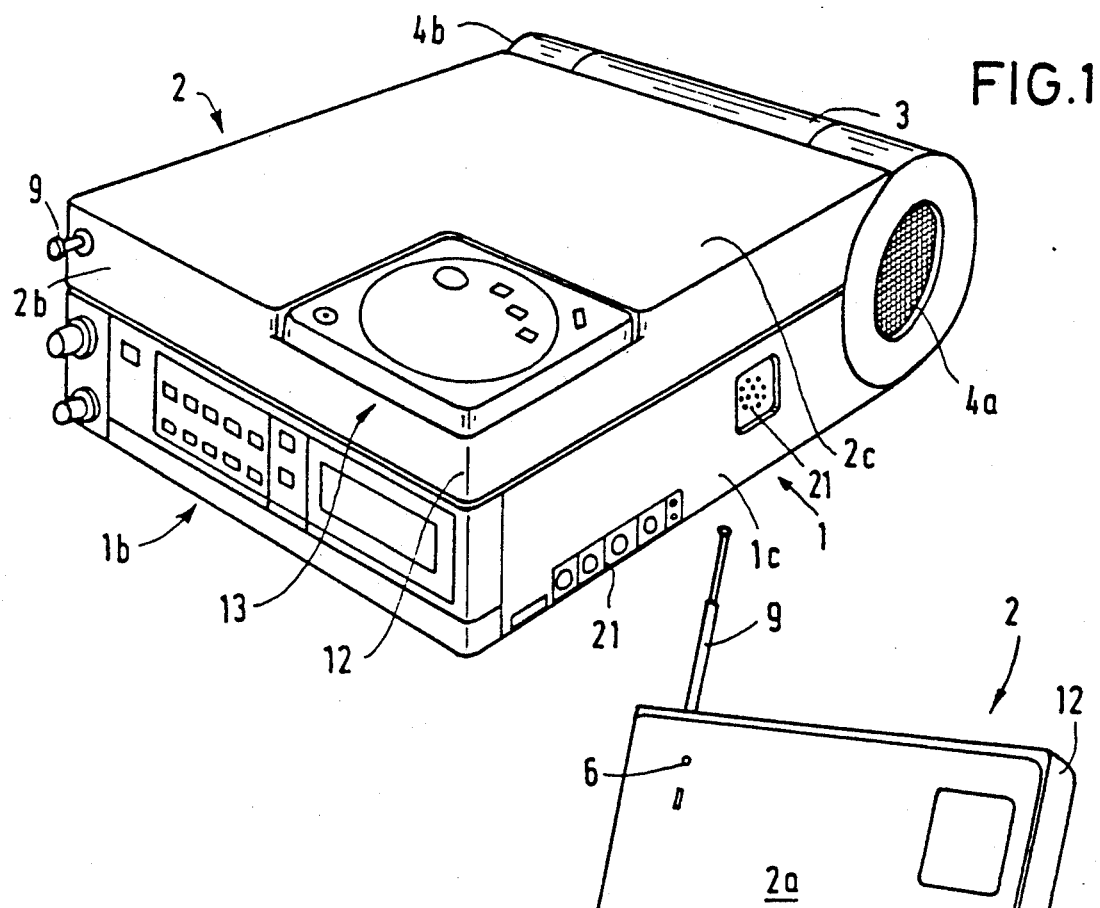
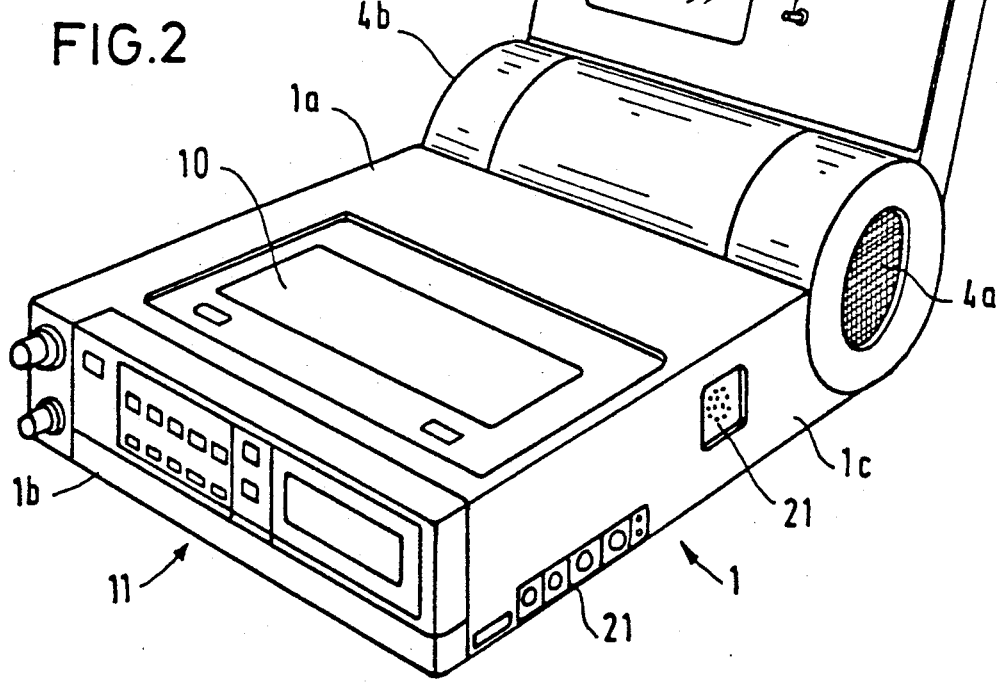

COMPACT VIDEO/SOUND APPARATUS WITH FOLDABLE SCREEN

The invention relates to a video/sound apparatus which is in the form of a suitcase-like foldable housing, including a housing cover portion for accommodating a screen, and a housing bottom portion for accommodating the controls, an image recording and reproduction device as well as recepticles for connecting the video/sound apparatus to auxiliary equipment, with the two housing portions being joined to each other by a hinge in which the stereo speakers are contained.

A video/sound apparatus of this type has been disclosed in the European patent EP 0 149 101 B1. The basic function of that apparatus is limited to video/sound recording. By contrast, it is the object of the present invention to incorporate features into the video/sound apparatus of the type described above which will broaden its usefulness beyond that of a video/sound recording apparatus while retaining its compact construction.

This object is achieved in that the video/sound apparatus is also equipped with a TV receiving/reproduction section as well as a CD player.

Thus, the video/sound apparatus of the present invention combines the functions of a television, video recorder and CD player.

Therefore, the apparatus is not only able to record and reproduce video and sound signals and to display the respective images for viewing, but also to receive video and sound and to play CD records.

The invention proposes that the antenna for the TV section be contained in the housing cover portion. Preferably, the antenna is of the telescopic type and thus represents an optimum compromise between good reception and minimum space to be occupied by the antenna. Of particular significance is the arrangement of the CD record playing section which, preferably, is in the form of a module that can be plugged into the housing cover portion. With the CD player being plugged into the video sound apparatus, current supply is via the battery or a connection of the video sound apparatus to an AC system, whereas in the disconnected state energy is supplied by a separate battery contained in the CD player. Thus, the CD player can be operated alternatively as an integral component of the video/sound apparatus or as a separate unit. Since the CD player does not have its own speakers, it is proposed that it be equipped with extra jacks for connection to an external speaker means, such as a pair of earphones.

According to a preferred embodiment of the video/sound apparatus, the CD playing device is adapted to be plugged into the housing cover portion in the area of the corner opposite the hinge and on the side of the housing cover portion facing away from the housing bottom portion. This will provide that the CD playing device is easily accessible, that is, it can simply be inserted into the housing cover and be removed therefrom.

The invention will now be described with reference to the accompanying drawings which illustrate one exemplary embodiment of the invention without restricting the scope thereof.

In the drawings

FIG. 1 is a perspective view of the video/sound apparatus according to the invention in the folded down position, as viewed from the front;

FIG. 2 is a view of the video/sound apparatus according to FIG. 1 in the open position;

Figure 3:
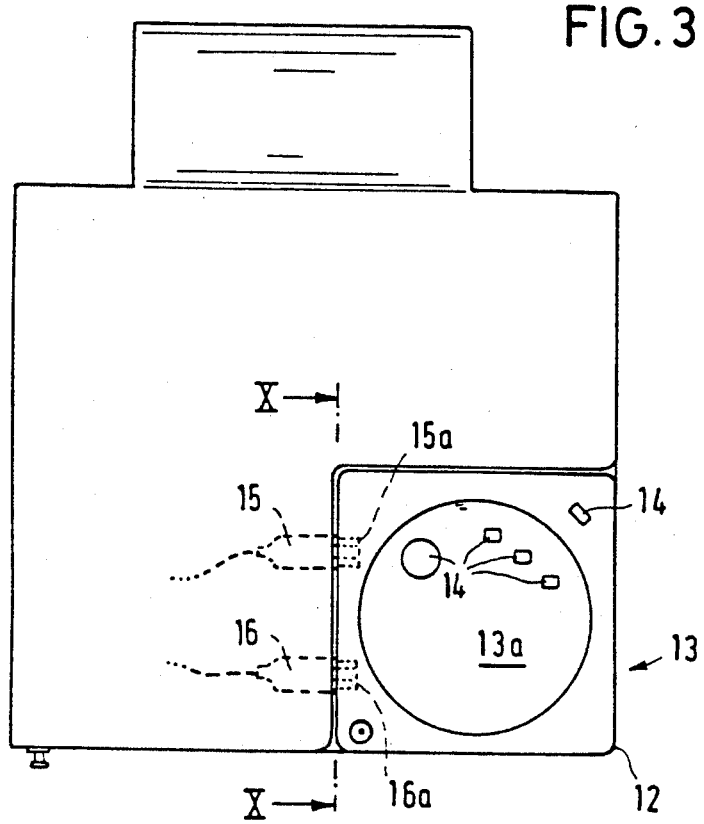
FIG. 3 is a plan view of the housing cover portion.

FIGS. 1 and 2 illustrate a housing bottom portion 1 and a housing cover portion 2 which are swingably connected to one another by a hinge 3. Hinge 3 is provided in the region of its respective ends with loudspeakers 4a and 4b which are facing in opposite directions so as to achieve a stereo effect.

The inner panel 2a of the housing cover portion 2 has a screen 5 integrated therein. The housing cover portion 2 also accommodates a TV receiving/reproduction device of the type known in the art (not shown in the drawings). A switch 6 which is integrated into the inner panel 2a enables to switch from UHF to VHF, and push buttons 7, 8 are provided for automatic station search. The front panel 2b accommodates a telescopic antenna 9 for TV reception.

The housing bottom portion 1 contains a video recording and a playback device 10 in the form of a cassette recorder which is accessible from the inner panel 1a of the housing bottom portion 1. The front panel 1b of the housing bottom portion 1 accommodates control elements 11 for the individual components of the apparatus. The side panel 1c is equipped with auxiliary recepticles 21 into which auxiliary equipment can be plugged, such as home computers, video games, telephone, keys for video text and BTX.

Figure 4:
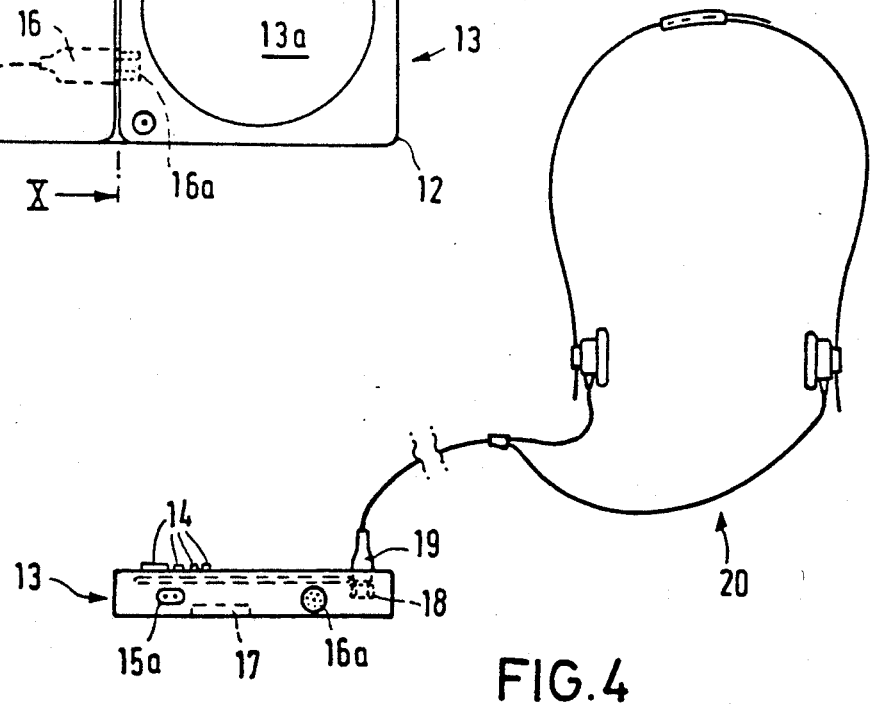
FIG. 4 is a view of the CD player, as viewed in the direction of arrows X according to FIG. 3, with a pair of ear phones connected to the device.

In the housing cover 2, the corner portion 12 facing away from the hinge 3 has inserted therein in the area of its outer panel 2c a CD player 13 which has a plate-like, square configuration. The type of CD player suggested for the apparatus according to the invention is the one used for playing CD singles. The CD player 13 as such is known in the art and is provided in the region of its surface 13a facing away from the housing cover 2 with various controls for its operation. The CD player 13 is in the form of a modular member and is adapted for plug-in connection into the housing cover portion 2, as is apparent from FIGS. 3 and 4 showing the plugs 15 and 16 which are integrated into the housing cover portion 2 and which are used for the current supply and the connection of the CD player to the remaining portion of the video/sound apparatus and to the speakers 4a and 4b. Upon insertion of the CD player 13, the plugs 15 and 16 are adapted for connection with recepticles 15a and 16a, respectively, which are provided in the set. It is assumed to be sufficient that the connection of the CD player 13 to the remainder of the set be done exclusively by way of the plug/recepticle members, but it should be understood that additional fastening means for the CD player 13a may be employed. The CD player 13 is also equipped with its own battery 17 and a recepticle 18 for connection with a plug 19 of a pair of earphones 20. With the CD player 13 being inserted into the main set, current for the CD player operation is supplied by a battery (not shown) contained in that set, or by an AC system to which the main set can be connected, and the sound of the record is transmitted through the speakers 4a and 4b. When the CD player 13 is to be operated separately, it is removed from the main set and connected to the earphones 20. In this case the necessary energy for the operation of the CD player 13 is supplied by its own battery 17.

The video/sound apparatus, according to the invention, may also come equipped with a receiving section for infrared remote control (not shown) by which the various components of the apparatus may be controlled. In addition, the video/sound apparatus according to the invention may be equipped with a radio receiving section.

I claim:

1. A video/sound apparatus comprising:
   a suitcase-like housing having a cover portion, a bottom portion, and means for pivotably connecting said cover portion to said bottom portion;
   a pair of stereo speakers facing in opposite directions, said pair of stereo speakers being incorporated in the ends of said means for pivotably connecting;
   a TV receiving/reproduction system mounted within said cover portion, said TV receiving/reproduction system having a video screen for reproducing a visual portion of received TV signals, said TV receiving/reproduction system further connected to said pair of stereo speakers for reproducing the audio portion of said received TV signals; and
   a CD record player releasably mounted on said cover portion, said CD record player having an output connected to video sound apparatus for play through said pair of stereo speakers when said CD record player is mounted on said cover portion.

2. Video/sound apparatus according to claim 1, characterized in that said cover portion (2) contains an antenna (9) for said TV receiving/reproducing system.

3. Video/sound apparatus according to claim 2, characterized in that said antenna is a telescope-type antenna (9).

4. Video/sound apparatus according to claim 1 characterized in that said CD record player (13) is in the form of a modular member which is adapted for insertion and plug-in connection into said cover portion (2).

5. Video/sound apparatus according to claim 4, characterized in that said CD record player (13) is adapted for plug-in connection in the area of a corner (12) of said cover portion (2) opposite said means for connecting on the side (2c) of said cover portion facing away from said bottom portion (1).

6. Video/sound apparatus according to claim 4, characterized in that
   the CD record player (13) is equipped with its own battery (17) and an auxiliary recepticle (18) for connection to an external speaker means, especially to a pair of earphones (20).

7. The video/sound apparatus according to claim 1, wherein said bottom portion houses a video recording and playback device, said video recording and playback device being connected to said TV receiving/reproduction system.

8. The video/sound apparatus according to claim 1, wherein means for controlling said TV receiving/reproducing system and said video recording and playback device are mounted in said bottom portion;
   said means for controlling comprising means for activating and operating said video recording and playback device and said TV receiving/reproduction system.

9. The video/sound apparatus according to claim 1, wherein said bottom portion further has receptacle means for connecting said video/sound apparatus to at least one auxiliary device for use with said video/sound apparatus.

10. The video/sound apparatus according to claim 1, wherein said at least one auxiliary device is selected from a plurality of auxiliary devices comprising a computer, video games, telephones, keyboard for video text and BXT.

* * * * *